Figure 1:
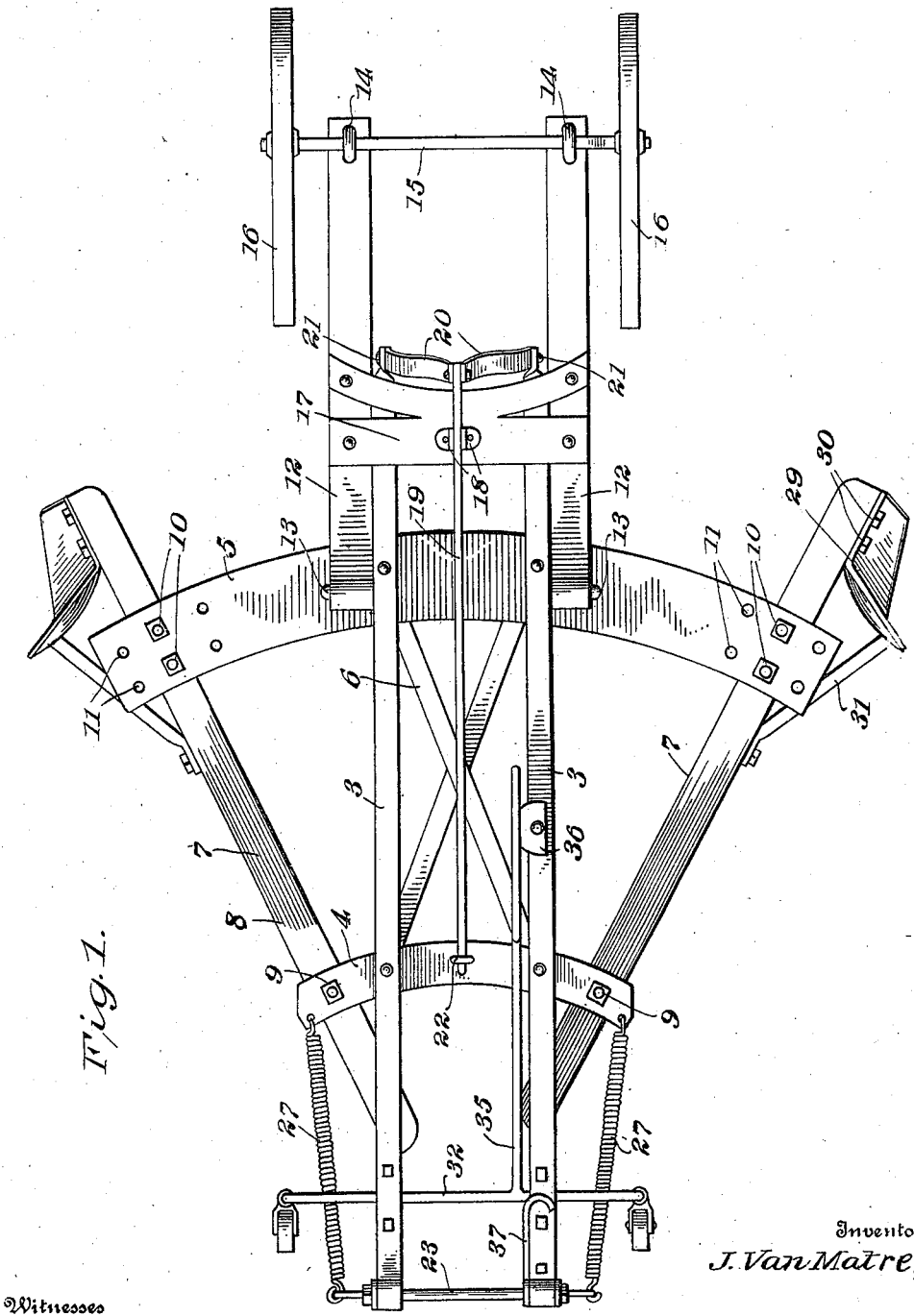

J. VAN MATRE.
ROAD SCRAPER AND GRADER.
APPLICATION FILED JUNE 29, 1909.

963,963.

Patented July 12, 1910.
2 SHEETS—SHEET 1.

Witnesses
J. A. Bishop
F. R. Cornwall

Inventor
J. Van Matre,

By Dudley, Brown + Phelps
Attorney

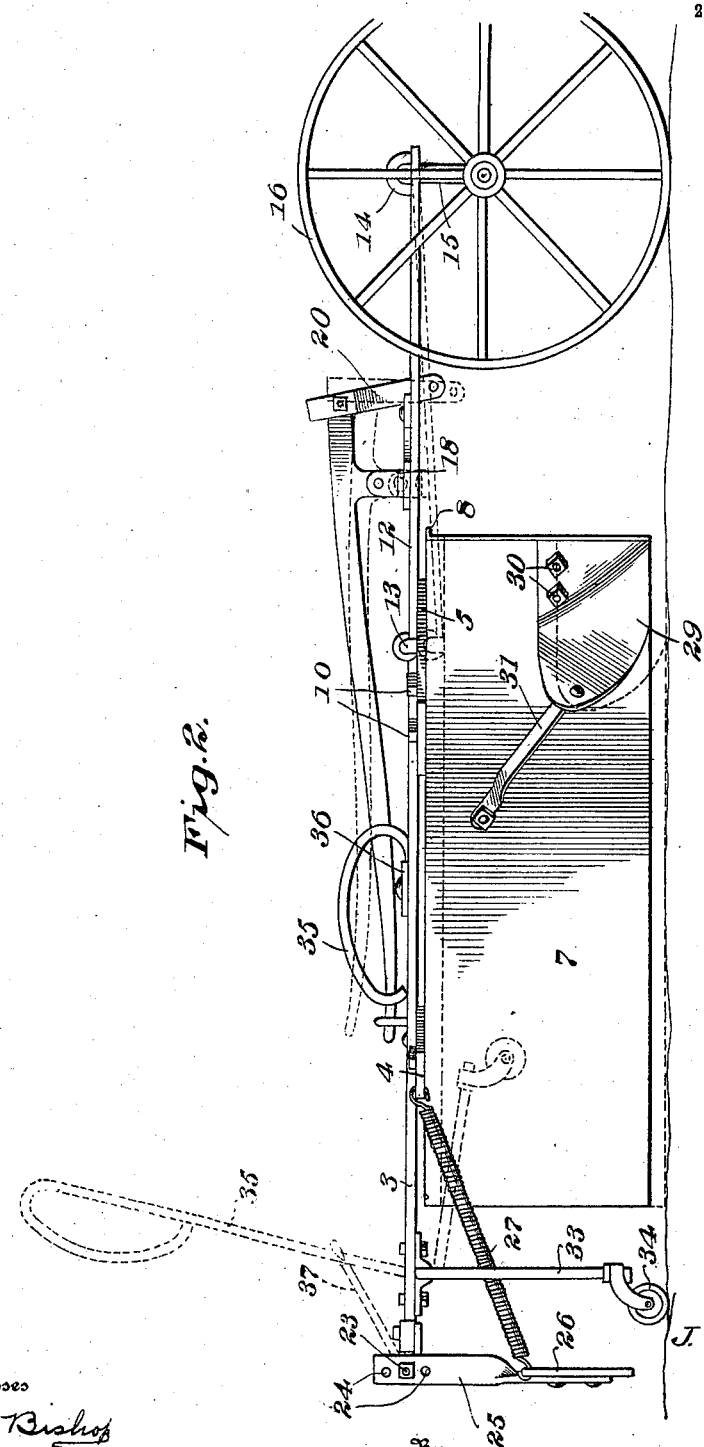

UNITED STATES PATENT OFFICE.

JOSEPH VAN MATRE, OF NEWCASTLE, INDIANA.

ROAD SCRAPER AND GRADER.

963,963.
Specification of Letters Patent.
Patented July 12, 1910.

Application filed June 29, 1909. Serial No. 505,059.

*To all whom it may concern:*

Be it known that I, JOSEPH VAN MATRE, a citizen of the United States, residing at Newcastle, in the county of Henry and State of Indiana, have invented certain new and useful Improvements in Road Scrapers and Graders, of which the following is a specification.

My invention relates to certain new and useful improvements in road scrapers and graders and particularly to that class of road scrapers which is adapted to scrape the dirt from the sides of the road onto the middle portion thereof in order to properly round the top surface to produce the desired crown thereto, and the object of my invention is to produce a device of this character which is simple in construction and effective in operation.

With these and other objects in view my invention consists in certain constructions, combinations and arrangements of parts the preferred form of which will be first described in connection with the accompanying drawings and then the invention particularly pointed out in the appended claims.

Referring to the drawings wherein the same part is designated by the same reference numeral wherever it occurs Figure 1 is a top plan view of the preferred embodiment of my invention; Fig. 2 is a side elevation thereof.

3 designates a pair of parallel bars to which are secured the segmental plates 4 and 5, and 6, 6 are a pair of cross braces extending from the plate 5 and bracing the same. These parts together constitute the frame of my scraper. 7, 7 are a pair of scrapers extending down from the under side of the segmental plates 4 and 5, these scrapers being preferably provided with a flange 8 on their upper edge through which are passed bolts 9, 10, the bolts 9 securing the rear end of the scraper to the plate 4, while the bolts 10 secure the front portion of the scrapers to the plate 5. Preferably, and as shown, the plate 5, is provided with a plurality of sets of openings 11 for the bolts 10, whereby the space between the scrapers may be adjusted for various widths of roads.

12, 12 designate a pair of bars hinged at 13 to the top portion of the plate 5 and carrying at their outer free end the clamps 14 adapted to engage an axle 15 supported on the wheels 16. This axle 15 may be, if desired, the rear axle of a wagon or other vehicle.

17 designates a cross bar connecting the bars 12 together intermediate their ends.

18 designates a pair of ears secured to the top portion of the bar 17, and between these ears is mounted a lever 19 pivotally connected at one end to a pair of links 20, which latter are in turn pivotally connected by the pivots 21 to the forward ends of the bars 3. The lever 19 extends rearwardly and may be locked by forcing the same under a catch 22. At the rear end of the bars 3 I mount a supporting shaft 23 which passes through one pair of the series of openings 24 in the supporting arms 25 of a scraper 26. The scraper plate 26 is arranged at right angles to the line of movement of the scraper, so that it will operate to smooth off the top surface as it has been scraped from the sides of the road up onto the middle portion. In order to yieldingly hold this scraper 26 in the above position I provide a pair of springs 27 connected at one end to opposite sides of the scraper blade and at the other end to the ends of the plate 4.

Preferably, and as shown, I mount at the front edge of each of the scraper blades 7 a plow 29 connected to the edge of the scraper blades by means of the bolts 30. Preferably, and as shown, the outer portion of this plow is braced by the brace 31, which extends from the side of the scraper plate of the rib portion of the plow.

In order to support the scraper at its back end when not in use I journal on the rear part of the bars 3 a shaft 32 having its ends bent at right angles to form two legs 33 on the lower end of which I mount rollers or casters 34.

35 is a lever formed on the shaft 32, said lever being adapted to be swung as shown in full and dotted lines in Fig. 2, whereby the rollers may be swung into either the full or dotted line position to raise and lower the back portion of the scraper.

36 is a catch under which the end of the lever may be placed to hold the rollers in contact with the ground as shown in full lines in Fig. 2, and 37 is a loop adapted to engage the lever 35 when the same is in the position shown in Fig. 2 and hold the rollers out of contact with the ground.

In the operation of my device the front portion is secured to the axle of a pair of wheels which may or may not form a part of a wagon or other vehicle by means of the securing devices 14. The lever 19 is caught under the catch 22 and the lever 32 is caught under the catch 36. This operates to raise both ends of the scraper, so that the same may be drawn to wherever it is desired to use the same. To cause the scraper to operate the lever 35 is operated to throw up the rollers 34 and the lever engaged by the catch 37. The lever 19 is now disengaged from its catch 22 so that the front of the scraper is now supported from the axle. Upon drawing the scraper over the road after having adjusted the scrapers 7 so that they will properly reach the sides of the road, and also adjusting the height of the scraper 26 above the road, the material of which the road is formed will be scraped from the sides of the road and arched up in the middle. The plows at the sides of the scrapers will operate to clear out the ditches in the sides of the road.

From this construction it will be seen that by a single operation of drawing my scraper over the road the re-making of the road and side ditches is completed.

I realize that considerable variation is possible in the details of construction and arrangement of parts without departing from the spirit of my invention, and I therefore do not intend to limit myself to the specific form shown and described.

Having described my invention what I claim as new and desire to secure by Letters Patent is:

1. In a road scraper and grader, the combination with a frame, a pair of scraper plates mounted on said frame each extending at an angle to the longitudinal axis of the frame with the angles opening toward the front thereof, and segmental plates connecting the frame and scraper blades and having adjustable connection with said scraper blades whereby the angle of said scrapers may be adjusted.

2. In a road scraper and grader, the combination with a frame, a pair of scraper plates mounted on said frame each extending at an angle to the longitudinal axis of the frame with the angles opening toward the front thereof, segmental plates connecting the frame and scraper blades and having adjustable connection with said scraper blades whereby the angle of said scrapers may be adjusted, and a plow carried at the forward edge of each scraper blade.

3. In a road scraper and grader the combination with a frame, of a pair of scraper blades mounted on said frame, said blades each extending at an angle to the longitudinal axis of the frame with the angles opening toward the front of the frame, the rear ends of said scrapers being separated and a scraper plate yieldingly mounted and extending across the space between the rear ends thereof.

4. In a road scraper and grader the combination with a frame, of a pair of scraper blades mounted on said frame, said blades each extending at an angle to the longitudinal axis of the frame with the angles opening toward the front of the frame, and a pair of casters hinged at the back portion and adapted when lowered to support the rear portion of said scraper.

5. In a road scraper and grader the combination with a frame, of a pair of scraper blades mounted on said frame, said blades each extending at an angle to the longitudinal axis of the frame with the angles opening toward the front of the frame, a supplemental frame hinged to the front of said frame, said supplemental frame being adapted to be connected to a wheel supported axle, and means for moving said supplemental frame on its hinges to raise and lower the front portion of said scraper.

In testimony whereof I affix my signature in presence of two witnesses.

JOSEPH VAN MATRE.

Witnesses:
CLARENCE H. BEARD,
WILLIAM A. DALE.